(12) United States Patent
Hartung et al.

(10) Patent No.: US 7,671,490 B2
(45) Date of Patent: Mar. 2, 2010

(54) SYSTEM FOR HIGH RELIABILITY POWER DISTRIBUTION WITHIN AN ELECTRONICS EQUIPMENT CABINET

(75) Inventors: David B. Hartung, Belmont, MI (US); Brian G. Krug, Ada, MI (US)

(73) Assignee: Smiths Aerospace LLC, Grand Rapids, MI (US)

( * ) Notice: Subject to any disclaimer, the term of this patent is extended or adjusted under 35 U.S.C. 154(b) by 44 days.

(21) Appl. No.: 11/250,566

(22) Filed: Oct. 17, 2005

(65) Prior Publication Data

US 2007/0085420 A1    Apr. 19, 2007

(51) Int. Cl.
   *H01H 47/00* (2006.01)
(52) U.S. Cl. .................... 307/115; 307/24; 307/113; 307/125; 307/130
(58) Field of Classification Search .............. 307/24, 307/113, 115, 125, 130
   See application file for complete search history.

(56) References Cited

U.S. PATENT DOCUMENTS

| | | | |
|---|---|---|---|
| 5,726,505 A * | 3/1998 | Yamada et al. | 307/127 |
| 5,914,542 A * | 6/1999 | Weimer et al. | 307/125 |
| 6,222,346 B1 | 4/2001 | Mori | |
| 6,275,958 B1 * | 8/2001 | Carpenter et al. | 714/48 |
| 6,438,007 B1 * | 8/2002 | Pilukaitis et al. | 363/65 |
| 6,900,624 B2 * | 5/2005 | Abo | 323/284 |
| 7,049,796 B2 * | 5/2006 | Cherniski et al. | 323/271 |
| 7,154,722 B1 * | 12/2006 | Stoupis et al. | 361/62 |

FOREIGN PATENT DOCUMENTS

| | | |
|---|---|---|
| EP | 0690554 A2 | 1/1996 |
| WO | WO 03/098403 A3 | 11/2003 |

\* cited by examiner

*Primary Examiner*—Albert W Paladini
*Assistant Examiner*—Hal I Kaplan
(74) *Attorney, Agent, or Firm*—William Scott Andes, Esq.; Armstrong Teasdale LLP (57) ABSTRACT

The power conversion system allows for multiple segregated and ground independent power sources to provide redundant power to modules within an electronics equipment cabinet with increased reliability and reduced sensitivity to common fault propagation. The power conversion system provides power conditioning modules having independent supply rails that supply power to each module within an electronics equipment cabinet. FET and diode solid-state control and driver logic enable each individual supply rail. Efficient power distribution is facilitated by primary and hot-backup operation of one or more power conditioning modules. Power conversion is facilitated by one or more input supply power feeds and one or more converter stages.

8 Claims, 9 Drawing Sheets

| Q1 | Q2 | Vout | Description |
|---|---|---|---|
| Off | Off | 0 | No supply output voltage or current |
| Off | On | 11.3 V | Supply voltage is active and operates in a hot-standby supply scenario, with reverse current protection provided by the diode. |
| On | Off | 0 | No supply output voltage or current; reverse protection is over-ridden and therefore logic will be implemented to insure Q1 is not allowed active when Q2 is inactive. |
| On | On | 12.0 V | Efficient Output Supply – no diode loss |

| | Q1 A | Q2 A | Q1 B | Q2 B | Vout | Load | Description |
|---|---|---|---|---|---|---|---|
| 505 | Off | Off | Off | Off | 0 | Off | No supply output voltage or current |
| 510 | On | On | Off | Off | 12.0 V A | On | Efficient Output Supply A – no diode loss; no standby supply from B; B side provides voltage BIT only or perhaps has been removed from the system. |
| 515 | Off | Off | On | On | 12.0 V B | On | Efficient Output Supply B – no diode loss; no standby supply from A; A side provides voltage BIT only or perhaps has been removed from the system. |
| 520 | Off | On | Off | Off | 11.3 V A | On | Supply A voltage is active – Low efficiency A drive (perhaps B supply operating as primary is being hot-swapped). |
| 525 | Off | Off | Off | On | 11.3 V B | On | Supply B voltage is active – Low efficiency B drive (perhaps A supply operating as primary is being hot-swapped). |
| 530 | On | On | Off | On | 12.0 V A / 11.3 V B | On | Supply A voltage is active with efficiency – Supply B provides standby; This is the typical operation case for A side primary supply of load. |
| 535 | Off | On | On | On | 12.0 V B / 11.3 V A | On | Supply B voltage is active with efficiency – Supply A provides standby; Typical operation case for B side primary supply of load. |

Fig. 6

| | Q1 A | Q2 A | Q1 B | Q2 B | Vout | Load | Description |
|---|---|---|---|---|---|---|---|
| 505 | Off | Off | Off | Off | 0 | Off | No supply output voltage or current |
| 520 | Off | On | Off | Off | 11.3 V A | On | Supply A voltage is active – Low efficiency A drive |
| 540 | On | Off | Off | Off | 0 | Off | No supply output voltage or current |
| 510 | On | On | Off | Off | 12.0 V A | On | Efficient Output Supply A – no diode loss; no standby supply from B |
| 525 | Off | Off | Off | On | 11.3 V B | On | Supply B voltage is active – Low efficiency B drive |
| 605 | Off | On | Off | On | 11.3 V A & B | On | Both Supply voltages are active –diodes allow for voltage offsets with no back-drive. Default power on case, Low Efficiency; Pre-defined outputs transition from here to Q1's ON for normal operation. Or predefined supply could jump to both Q's on at power up. |
| 610 | On | Off | Off | On | 11.3 V B | On | Supply B voltage is active – Low efficiency B drive. Reverse protection on A drive is over-ridden with Q1A on. This case needs to be protected against such that any time Q2 is off, Q1 must be off. |
| 530 | On | On | Off | On | 12.0 V A 11.3 V B | On | Supply A voltage is active with efficiency – Supply B provides standby; Typical operation case for A side supply of load. |
| 615 | Off | Off | On | Off | 0 | Off | No supply output voltage or current. The Q1 on while Q2 off case shall be eliminated in logic. |
| 620 | Off | On | On | Off | 11.3 V A | On | Supply A voltage is active – Low efficiency A drive; Reverse protection on B drive is over-ridden with Q1B on. This case needs to be protected against such that any time Q2 is off, Q1 must be off. |
| 625 | On | Off | On | Off | 0 | Off | No supply output voltage or current The Q1 on while Q2 off case shall be eliminated in logic. |
| 630 | On | On | On | Off | 12.0 V A | On | Supply A voltage is active with efficiency – Reverse protection on B drive is over-ridden with Q1B on. This case needs to be protected against such that any time Q2 is off, Q1 must be off. |
| 515 | Off | Off | On | On | 12.0 V B | On | Efficient Output Supply B – no diode loss; no standby supply from A |
| 535 | Off | On | On | On | 12.0 V B 11.3 V A | On | Supply B voltage is active with efficiency – Supply A provides standby; Typical operation case for B side supply of load. |
| 640 | On | Off | On | On | 12.0 V B | On | Supply B voltage is active with efficiency – Reverse protection on A drive is over-ridden with Q1A on. This case needs to be protected against such that any time Q2 is off, Q1 must be off. |
| 645 | On | On | On | On | 12.0 V A 12.0 V B | On | Fault Case as supplies back-drive each other. Evaluation of current mode/feedback is needed. The supply controller should never turn on a Q1 if the voltage sensed at the load is higher than the supply's nominal. The other way of mitigating the issue is to say that backup supply always runs in-efficiently and thereby Q1 never is turned on for a backup supply operation. |

SYSTEM FOR HIGH RELIABILITY POWER DISTRIBUTION WITHIN AN ELECTRONICS EQUIPMENT CABINET

BACKGROUND

The present invention generally relates to the field of power conversion and power distribution. Specifically, the present invention is directed to an efficient system for power conversion and distribution in an electronics equipment cabinet for avionics systems.

Electronics equipment cabinets convert and distribute internal power supplied by an aircraft power source. Generally, power conversion and distribution in electronics equipment cabinets is accomplished using single rail supply designs. For example, the Boeing 787 power distribution system uses a single rail output. The single rail design feeds power to load modules. Generally, the load modules are power converters.

The existing power conversion and distribution systems used in the Boeing 787 have significant safety and reliability issues. For example, multiple power supplies share load modules. Load module sharing leads to undesirable operational conditions such as reverse current flow. Today's high reliability applications require segregated, redundant power supply inputs. These power supplies must support power requirements for internal load modules without adding circuit complexity, power loss or decreased reliability. Moreover, efficient power distribution within modern electronics equipment cabinets will require a system with hot-swap capability, redundancy and fault tolerant design. Modern electronics equipment cabinets are typically constructed from one or more power supply converters and several electronics modules innerconnected on a back plane.

SUMMARY

According to one embodiment of the invention, a power conditioning module has a plurality of switched output power rails, wherein each switched output power rail comprises a first field effect transistor drive configured to receive an input, a diode connected in parallel with the first field effect transistor drive and a second field effect transistor drive, connected in series with the first field effect transistor drive and the diode, whereby the second field effect transistor is configured to deliver an output to a load.

According to another embodiment of the invention, a power conversion system, comprises a first power conditioning module providing an input to a load and a second power conditioning module providing an input to the load, wherein the load comprises a hot swap control unit operably coupled to the first power conditioning input and the second power conditioning input, whereby the hot swap control unit receives a single input and a power converter, configured to receive a single input from the hot swap control, having a plurality of outputs with varying voltages.

According to yet another embodiment of the invention, a power conversion system, comprises a first power conditioning module, configured to receive an input from a input power backplane and provide a plurality of outputs to an output power backplane, a second power conditioning module, configured to receive an input from a input power backplane and provide a plurality of outputs to a output power backplane and a third power conditioning module configured to receive an input from a input power backplane and provide a plurality of outputs to a output power backplane, wherein a plurality of loads are operably coupled to the output power backplane, each load receiving one input from the output power backplane.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 5 is a truth table for the normal operation of the power conversion system shown in FIG. 4.

FIG. 6 is a truth table for all possible operational modes of the power conversion system shown in FIG. 4.

DETAILED DESCRIPTION

Figure 1A:
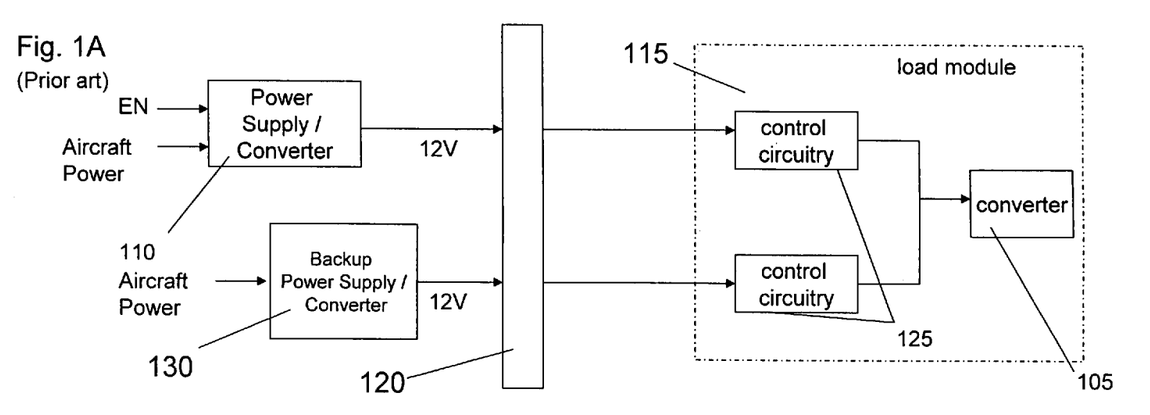
FIG. 1A shows a typical power distribution system in an electronics equipment cabinet.

FIG. 1A shows a single fault power distribution system typically found in an aircraft's electronics equipment cabinet. The purpose of the system is to convert power received from the aircraft system bus into a useable form. Typically, the aircraft power input may be 28 volts DC or 270 volts AC.

A power converter 105 distributes low voltage power to electronics housed within an electronics equipment cabinet. Generally, the total amount of power distributed is 12 volts. As shown in FIG. 1A, the output from a conventional power supply 110 and a backup power supply 130 are distributed in parallel to multiple load modules (or "loads") 115. Each load module 115 receives two inputs from the output power backplane 120. Further, each load 115 contains control circuitry 125 that determines which input the load 115 draws power from. In this configuration, when a load module 115 faults on one of its two power inputs, the load module 115 disrupts all power distribution from the power supply 110. To compensate for the disruption, all the load modules 115 must switch to a second power input, effectively causing all power to be distributed from a backup power supply 130. A second troubling characteristic of the system show in FIG. 1A is that current detection at the power supply 110 is aggregated. Aggregated current detection makes it difficult to determine whether a specific load module 115 is drawing more power than normal. Thus, aggregated current detection leads to a less efficient, less autonomous distribution system.

Figure 1B:
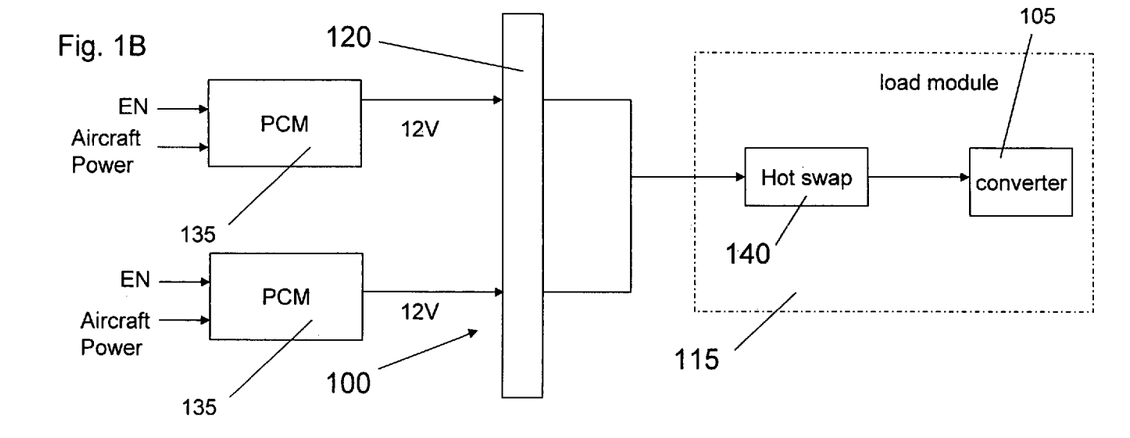
FIG. 1B is a block diagram of a power conversion system according to one embodiment of the invention.

The power conversion system 100 shown in FIG. 1B is designed to solve the above-mentioned problems. Specifically, the system 100 includes a power conditioning module ("PCM") 135. The PCM 135 contains control circuitry (not shown) that allows the PCM 135 to individually control the output to the load 115. The PCM 135 includes of a plurality of switched output rails (not shown) arranged in tandem. The load module 115 receives multiple common inputs that are presented as one input to a hot swap unit 140 and then on to the power converter 105. Current feedback is provided to the PCM 135 control circuitry so that there is individual detection of the power demand for each load module 115. Moreover, since the system distributes current through multiple segregated paths via the plurality of switched output power rails, I²R power losses are significantly reduced. Further, the plurality of segregated switched output power rails reduces/eliminates the likelihood of a fault occurring at one load module propagating to disrupt service on any other load modules. It will be noted that the distribution of a power rail between redundant sources may be inter-connected in the back plane 120, as shown in FIG. 1B, or at/within the power converter module, or any other effective location that will allow the present invention to be practiced. The system shown in FIG. 1B and its advantages will now be described in further detail below.

Figure 2:
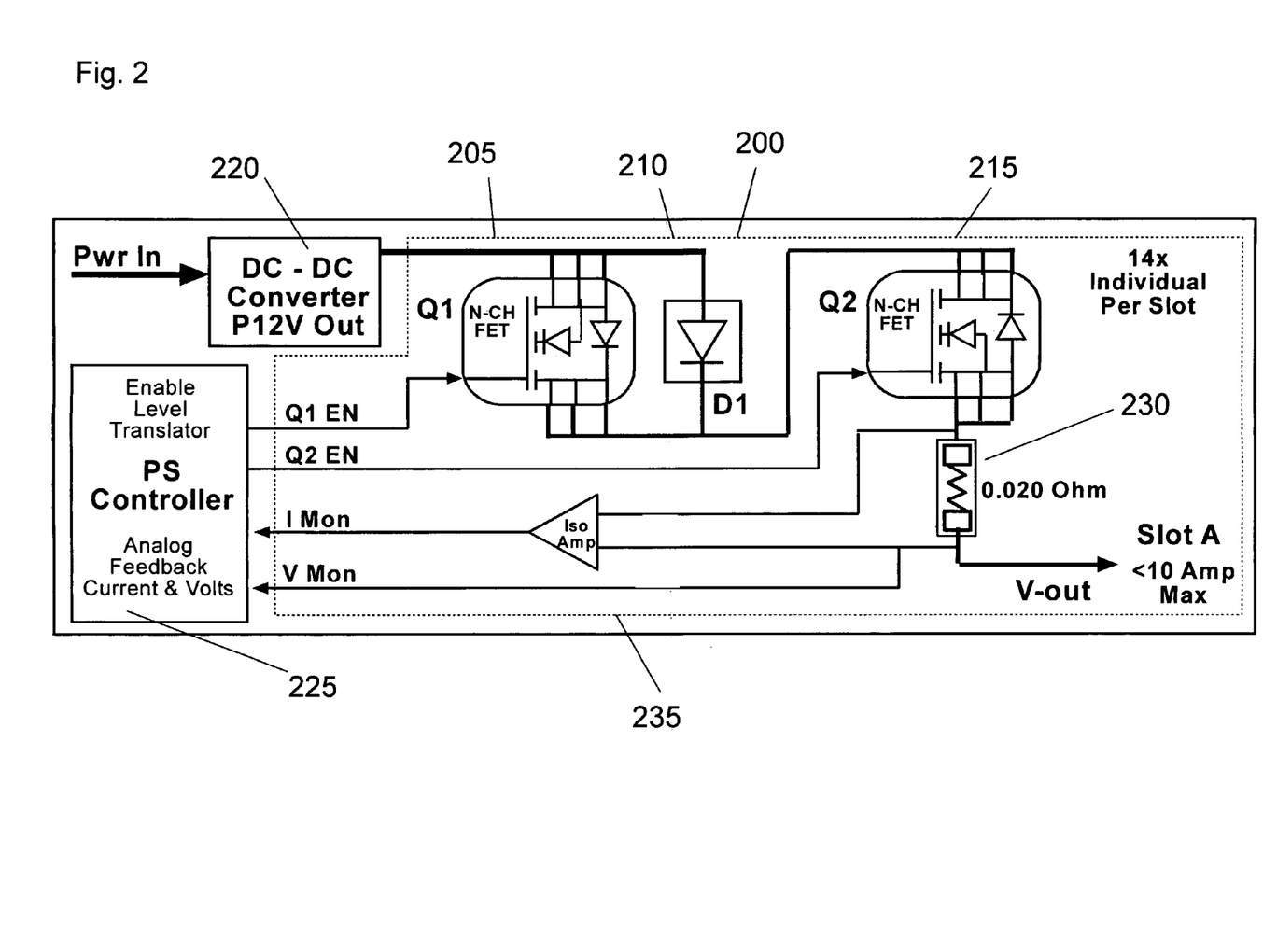
FIG. 2 is a diagram of a switched output power rail according to one embodiment of the present invention.

FIG. 2 shows a dual FET (Field Effect Transistor) switched output power rail 200 whereby a first FET drive ("Q1") 205 and a diode ("D1") 210 operate as a first stage and a second FET drive ("Q2") 215 provides the output drive as the second stage. The arrangement shown in FIG. 2 provides for supply "off" control as well as reverse current protection. As will be discussed later, the layout shown in FIG. 2 also facilitates hot backup supply operation. As indicated in FIG. 2, a PCM 135 may contain several individual switched output power rails 200. A number of switched output power rails 200 may provide an individual supply input for each load 115 and accommodate common or spare channel drives for the purposes of expansion. According to one embodiment of the invention, at least fourteen switched output power rails 200 are implemented per PCM 135. Other numbers of power rails may be utilized per PCM while remaining within the spirit and scope of the invention. It is noted that the term "FET" includes both traditional FETs and other FETs, such as MOSFETS, etc., and any other transistors that have similar characteristics to a FET.

The switched output power rail of FIG. 2 will now be described in detail. In FIG. 2, an aircraft power supply (not shown) feeds into a DC-DC converter 220. The DC-DC converter 220 provides an input voltage to FET Q1 205. FET Q1 205 is in parallel with a diode D1 210. One purpose of diode D1 210 is to provide reverse power protection to the switched output power rail 200. Reverse power protection allows multiple supplies operating with roughly the same output voltage characteristics to be hard connected together at the load side.

FET Q1 205 receives input from a power supply controller ("PS controller") 225. FET Q1 205 and the diode 210 are in series with FET Q2 215. FET Q2 215 also receives an input from the PS controller 225. A shunt resistor 230 is placed in series with FET Q2 215. The shunt resistor 230 is used primarily to implement a feedback mechanism. An isolation amplifier 235 receives as input a feed across the shunt resistor 230. The PS controller 225 accepts a feed from the isolation amplifier 235 as input to monitor the current. As shown in FIG. 1, the PS controller 225 accepts a second feed, V Mon, to monitor the voltage. Thus, feedback is provided to the PS Controller 225 concerning the load (power) values and the voltage output of the switched output power rail 200. Finally, as shown in FIG. 2, the output of the switched output power rail 200 ("V-out") provides the output power to a load 115 (not shown, but see FIG. 1).

Figure 3:
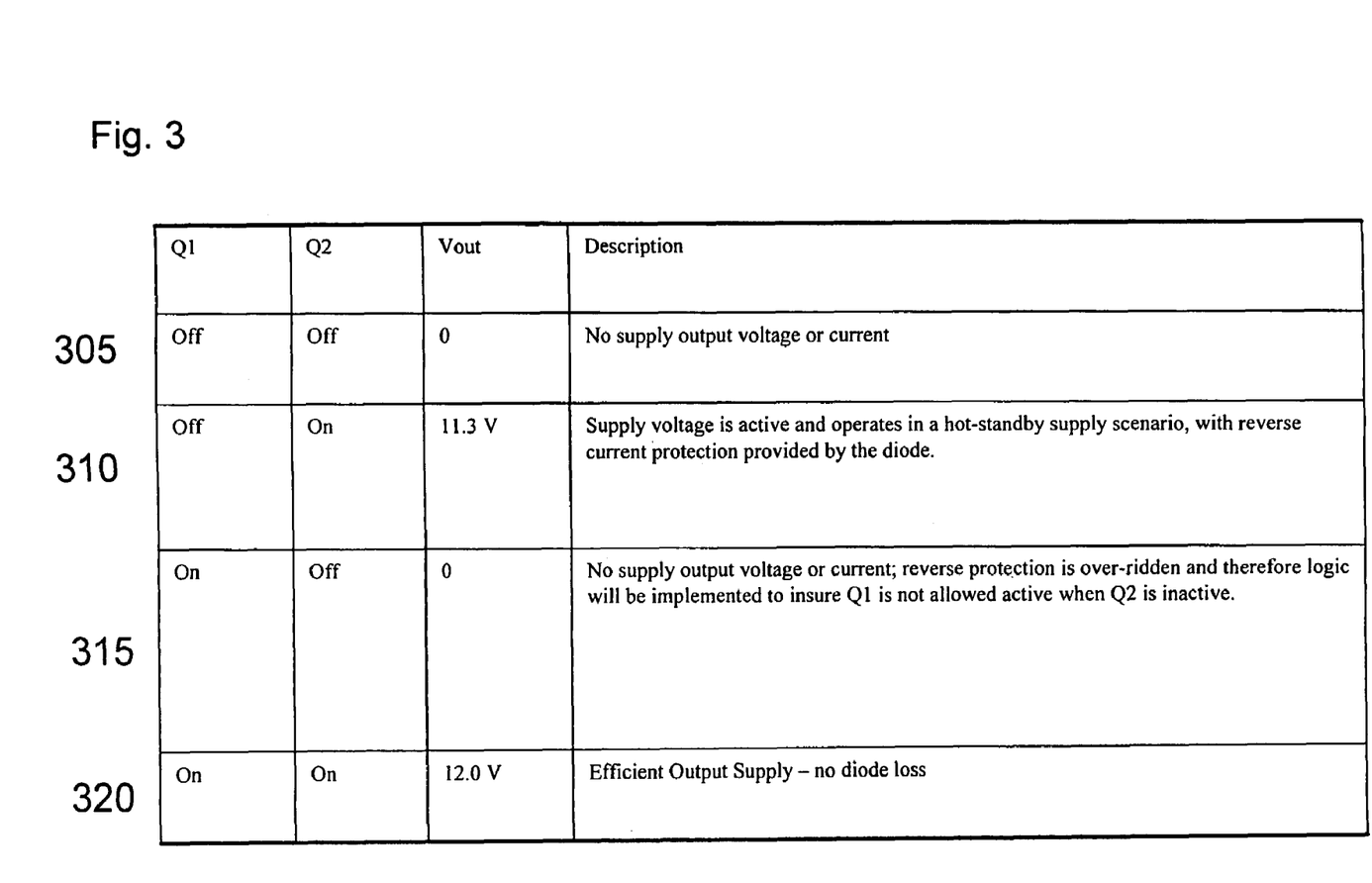
FIG. 3 is a truth table for the operation of the switched output power rail shown in FIG. 2.

The operation of the switched output power rail 200 will now be explained with reference to the truth table shown in FIG. 3. When both FET Q1 205 and FET Q2 215 are set to an "Off" state by the PS controller 225, the switched output power rail 200 does not supply any output voltage or current (case 305). As shown for case 320, when FET Q1 205 is set to an "On" state and FET Q2 215 is set to an "On" state by the PS controller 225, current does not flow through the diode D1 210 and an efficient voltage is supplied to the load 115. According to one embodiment of the invention, when the DC-DC converter 220 provides a 12V output, V-out is equal to 12 V.

When FET Q1 205 is set to Off and FET Q2 215 is set to On by the PS controller 225, current flows through the diode D1 210 and the second FET Q2 215 (case 310). Here, the switched output power rail 200 is operating in hot-standby supply mode. In this instance, the diode D1 210 provides reverse current protection. In addition, the diode D1 210 causes a smaller voltage to be supplied at V-Out than in the case when both FET Q1 205 and FET Q2 215 are set to on. According to one embodiment of the invention, when the DC-DC converter 220 provides 12V and FET Q1 205 is Off and FET Q2 215 is On, V-Out equals 11.3 V. Finally, when FET Q1 205 is set to On and FET Q2 215 is set to Off by the PS controller 225 no supply voltage or current is supplied to V-out (case 315). According to one embodiment of the invention, to prevent the needless activation of FET Q1 205 when FET Q2 215 is set to Off, the PS controller implements logic to insure FET Q1 205 is deactivated when FET Q2 215 is inactive.

Figure 4:
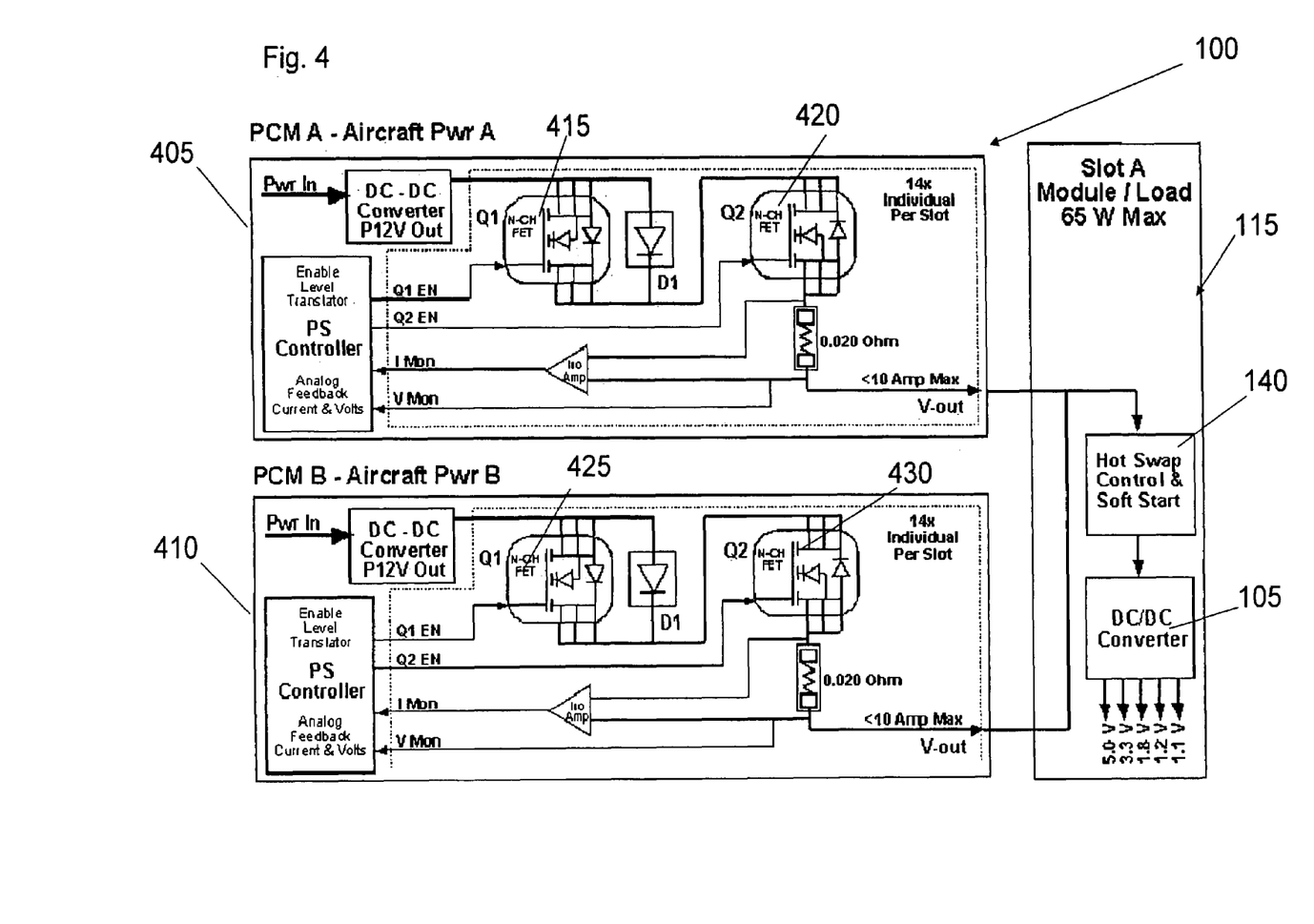
FIG. 4 is a diagram of a power conversion system, having two power conditioning modules, according to one embodiment of the present invention.

FIG. 4 shows a power conversion system 100 having two PCMs 135. As shown in FIG. 4, a PCM 135 is comprised of a set of switched output power rails 200. Further, a PCM 135 can be arranged with other PCMs 135 to create the power conversion system 100 shown in FIG. 4. The power conversion system 100 may include of one or more PCMs 135. Here, the power conversion system 100 shown in FIG. 4 is limited to two PCMs 135 for simplicity and explanation purposes only.

PCM A 405 and PCM B 410 are identical to the PCM 135 shown in FIG. 2. According to one embodiment of the invention, supply output provided to the input stage of the FETs Q1A 415, Q2A 420, Q1B 425 and Q2B 430 is maintained within 0.5 volts. As shown in FIG. 3, PCM A 405 and PCM B 410 provide voltage output to a load module 115, here designated as "Slot A Module/Load." The load 115 contains a hot swap unit 140 and a power converter 105.

According to one embodiment of the invention, the load 115 operates at a 65 W maximum. The outputs of both PCM A 405 and PCM B 410 feed into the hot swap unit 140. In turn, the output from the hot swap unit 140 feeds into the power converter 105. Voltage and built-in-test ("BIT") monitoring provide for fault detection and control feedback to insure proper operation. According to one embodiment of the invention, the power converter 105 is a DC/DC converter that provides outputs at 5, 3.3, 1.8, 1.2 and 1.1 volts.

The truth table shown in FIG. 5 lists the normal operational parameters of the system shown in FIG. 4. When FET Q1A 415 and FET Q2A 420 in PCM A 405 and FET Q1B 425 and FET Q2B 430 in PCM B 410 are set to Off, V-out equals zero (case 505). No supply output voltage or current is supplied to the load 115. Thus, the load 115 is powered Off. As shown in case 510, if FET Q1B 425 and FET Q2B 430 are set to Off, and FET Q1A 415 and FET Q2A 420 are both set to On, then an efficient voltage is supplied to V-out and the load 115 is turned on. According to one embodiment of the invention, 12V is supplied to the load 115. In this case, PCM A 405 provides efficient output supply to the load 115 by bypassing the diode D1A 435. Here, either PCM B 410 is not providing backup power or is not present on the system. As seen in FIG. 5, when FET Q1A 415 and FET Q2A 420 are set to Off and FET Q1B 425 and FET Q2B 430 are set to On (case 515), the reverse case occurs. V-out is supplied an efficient supply of power from PCM B 410 and the load 115 is powered on. The Off state of both FET Q1A 415 and FET Q2A 420 indicate that PCM A 405 is not set to provide backup power or is not present.

In case 520, FET Q1A 415 is set to Off and FET Q2A 420 is set to on. Adequate power is supplied to V-out and the load 115 is powered on. As described above, when FET Q2A 420 is On and FET Q1A 415 is Off, current flows through the diode D1A 435. This results in lower power supply efficiency. According to one embodiment of the present invention, a voltage of 11.3V is provided. Here, FET Q1B 425 and FET Q2B 430 are set to Off. Accordingly, PCM B 410 does not provide any power to the load 115. Similarly, when only FET Q2B 425 is set to On (Case 525), PCM B 410 exhibits the same behavior as PCM A 405 described above.

The final two cases (530, 535) shown in FIG. 5 demonstrate the optimal backup power operation of the power conversion system 100. When FET Q1B 425 is the only FET set to Off (case 530), an efficient power supply is supplied by PCM A 405. According to one embodiment of the invention, PCM A 405 provides 12 V of power. PCM B 410 provides an inefficient power supply and operates as a standby power source. According to one embodiment of the invention, PCM B 410 provides 11.3 V. In the case of removal of either supply, all loads are placed on the remaining supply without a glitch in the supply of power. Similarly, when FET Q1A 415 is the only FET set to Off (case 535), similar behavior is exhibited by the system. Here, an efficient power supply is provided by PCM B 410 and PCM A 405 operates in standby mode providing an inefficient supply voltage. It should be noted that in general, the PCM 135 operating as the primary supply also monitors current output and any occurrence of reverse current. If reverse current is detected FET Q1 205 shuts off, enabling diode D1 210 and thereby providing for reverse current protection.

According to one embodiment of the invention, approximately half of the loads 115 in a power conversion system are supplied as primary loads by PCM A 405. PCM B 410 provides hot backup to the PCM A 405 primary loads. Accordingly, half of the loads 115 in the system are supplied as primary loads by PCM B 410 while PCM A 405 provides hot backup for those loads.

One important feature of the system in FIG. 4 is that turning off a load 115 requires that both supplies have FET Q2 215 set to Off. According to one embodiment of the invention, the PS controller 225 for each PCM 135 executes logic such that when FET Q2 215 is set to Off, FET Q1 205 is set to Off. According to another embodiment of the invention, PCM A 405 and PCM B 410 transmit a valid signal to each other ("PS Valid"). The PS Valid signal allows for PCM A 405 and PCM B 410 to automatically switch from back up to primary mode if a fault occurs.

Further, each PS controller 225 implements certain logic operations in the system illustrated in FIG. 4. Primarily the logic will operate to prevent the case where FET Q1A 415, FET Q2A 420, FET Q1B 425 and FET Q2B 430 are all set to on. According to one embodiment of the invention, FET Q1 205 is not set to On unless its PCM 135 operates as a primary power source. Further, if PCM A 405 is set for primary operation but FET Q1A 415 and FET Q2 A 420 are Off, the load voltage is checked. According to one embodiment of the invention, if the load voltage is less than 11.5 V then FET Q1A 415 and FET Q2A 420 are switched on. In another embodiment of the invention, the voltage on a load 115 is monitored over a period of time "n." If the load voltage indicates that it is receiving power from a secondary supply voltage then a secondary supply, PCM B 410 for example, will switch FET Q1B 425 On and operate as a primary supply.

Further applications of the PS Valid signal will now be described. According to another embodiment of the invention, a PS Valid signal is provided from one PCM 135 to the other. For example, if PCM A 405 is removed, PCM B 410 will receive a signal indicating PCM A's 405 removal. PCM B 410 will then switch from secondary supply mode where FET Q1B 425 is Off and FET Q2B 430 is on, to primary supply mode where both FET Q1B 425 and FET Q2B 430 are set to on. Then, if PCM A 405 is engaged again, a PS Valid signal will indicate this to PCM B 410. Accordingly, PCM B 410 will switch to a secondary hot-backup mode and PCM A 405 will enter a primary supply mode. Thus, the efficient use of PS Valid in the control logic results in non-glitch operation from the loads 115 perspective.

FIG. 6 shows a truth table that further illustrates all possible operational modes for the dual PCM system 100 shown in FIG. 4. In the cases where FET Q2A 420 and FET Q2B 430 are set to Off (cases 505, 540, 615, 625), no voltage is supplied by either PCM 405, 410. The default power-on case 605 occurs when FET Q1A 415 and FET Q1B 425 are set to Off and FET Q2A 420 and FET Q2B 430 are set to On. Here, both PCMs provide low efficiency power. From this case either PCM 405, 410 can be enabled to provide full efficiency power by switching FET Q1A 415 or FET Q1B 425 on. According to one embodiment of the invention, during the powering on of the system 100 both PCMs 405, 410 are brought online to provide power at 11.3V.

As shown in FIG. 6, four cases can occur (610, 620, 630, 640) where a PCM has FET Q1A 415 or FET Q1B 425 set to On and FET Q2A 420 or FET Q2B 430 are set to Off. As described above, in cases 610 and 620, 11.3 V A is being supplied by the PCM 405, 410, and in cases 630 and 640, 12.0 V A is being supplied by the PCM 405, 410. In addition, because the FET Q1 205 is switched on, the diode D1 210 is bypassed and cannot implement reverse current protection for the switched output supply rail 200. In addition, case 645 is a fault case where FET Q1A, FET Q2A, FET Q1B and FET Q2B are all set to on. Similar to cases 610, 620, 630 and 640, case 645 is not a desired operation. Therefore, the PS controller 225 implements logic to eliminate these cases from occurring during actual operation. According to one embodiment of the invention, when FET Q2A 420 is set to Off, FET Q1A 415 is also set to Off. Further, when FET Q2B 430 is set to Off, FET Q1B 425 is set to Off.

Figure 7:
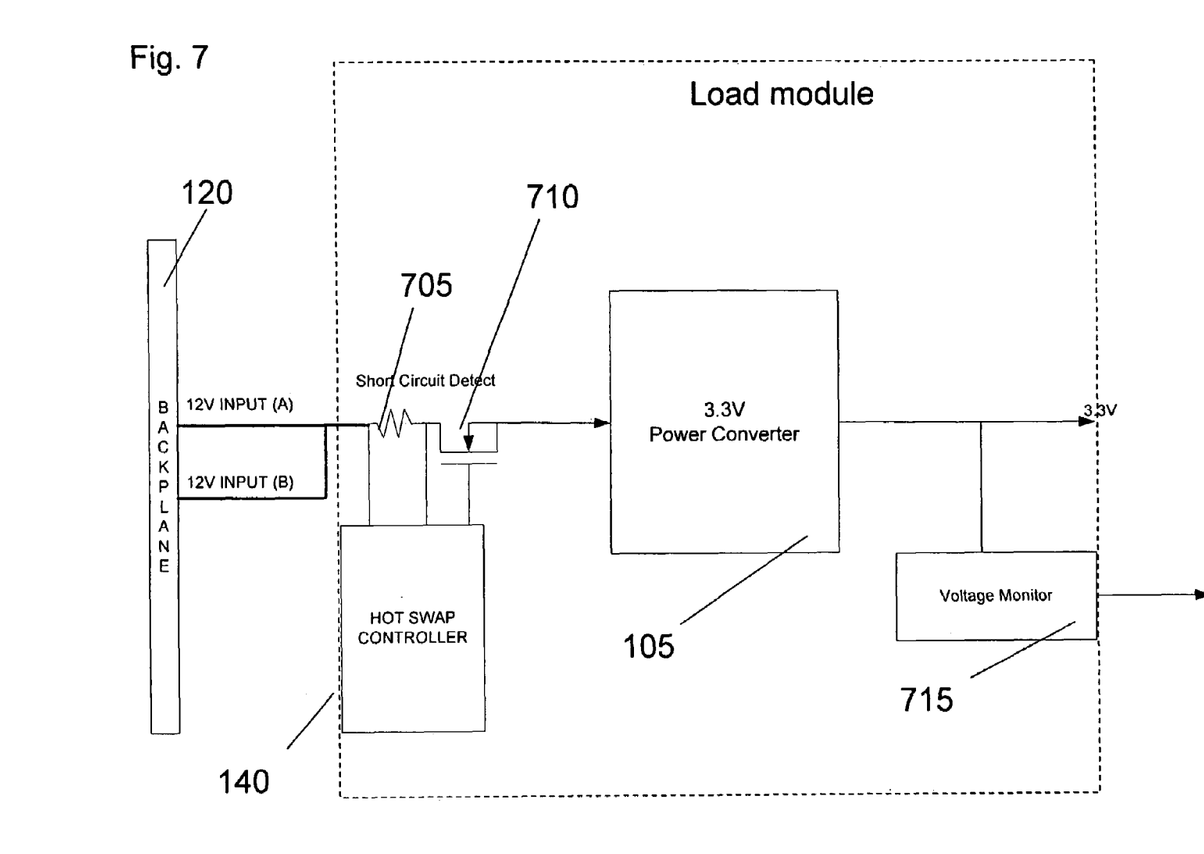
FIG. 7 is a diagram of a load module configured for use with the power conversion system according to one embodiment of the invention.

FIG. 7 is a detailed diagram of a load module 115 configured for use with the power conversion system 100 described above. Here, PCM A 405 provides input A and PCM B 415 B provides input B. As shown in FIG. 7, the load module 115 receives one input from the output power back plane 120. The input is in series with a resistor 705 used for short circuit detection and a transistor 710 that is controlled by a hot swap controller 140. The transistor 710 feeds to a power converter 105. According to one embodiment of the invention, the power converter 105 provides 3.3 V. A voltage monitor 715 is connected to V-out to monitor the output voltage.

Figure 8:
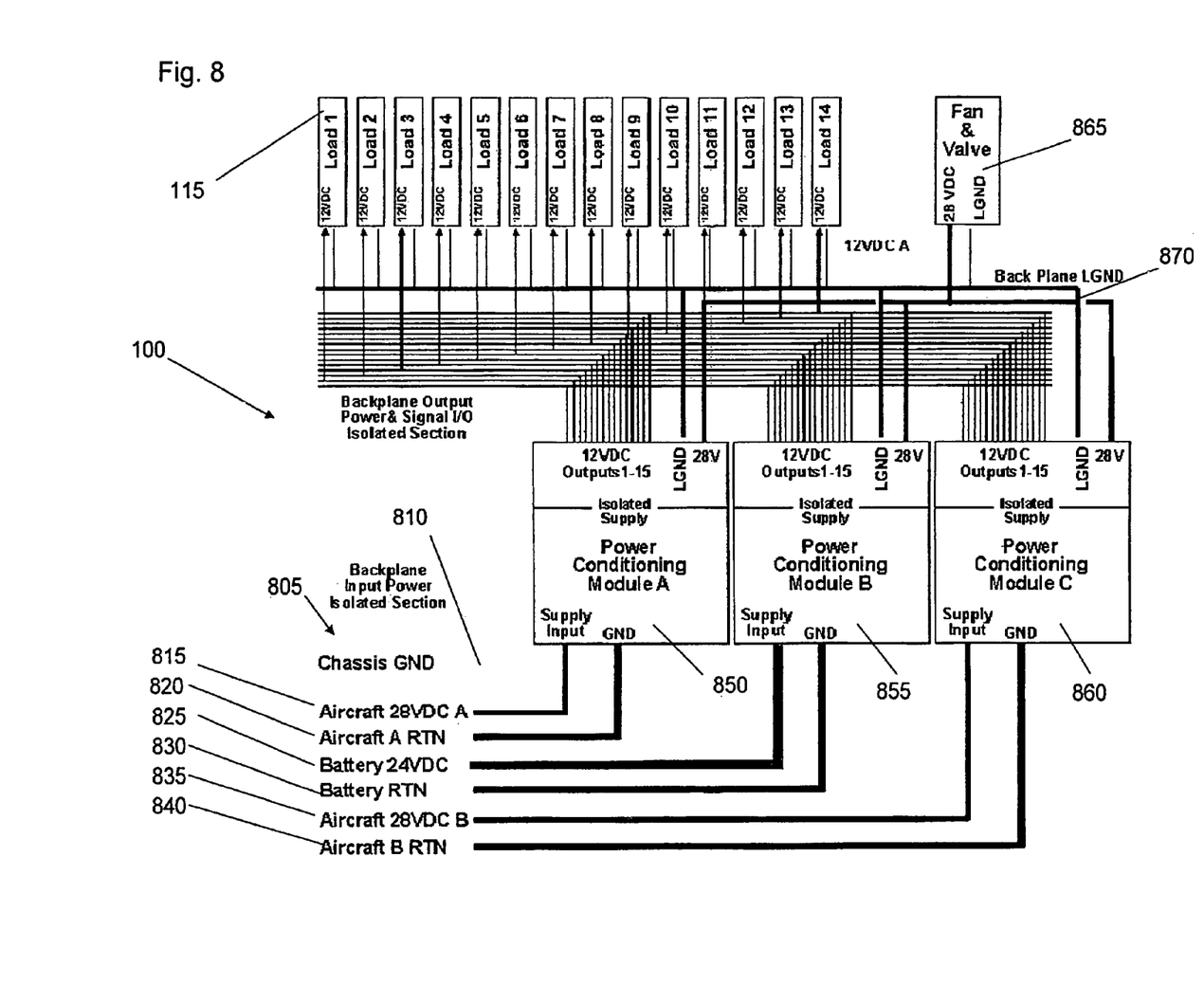
FIG. 8 is a diagram of a power conversion system according to one embodiment of the invention.

FIG. 8 illustrates a power conversion system 100 according to one embodiment of the invention. The input power backplane 805 includes a ground 810, a first aircraft power supply 815, a first aircraft return 820, a battery power input 825, a battery return 830, a second aircraft power supply 835 and a second aircraft return 840. According to one embodiment of the invention, the first 815 and second 835 aircraft inputs are 28 V DC and the battery input 825 is 24 V DC.

As shown in FIG. 8, three PCMs 135 are provided. The first aircraft input 815 feeds into PCM A's 850 supply input. The ground of PCM A 850 is connected to the first aircraft return 820. Similarly, the second aircraft power supply 835 feeds into PCM C's 860 supply input and the second aircraft return 840 is connected to the PCM C's 860 ground. Further, the battery power supply 825 is connected to the power supply input for PCM B 855. The battery return 830 is connected to the ground output of the PCM B 855.

As shown in FIG. 8, each PCM 850, 855, 860 has a voltage output that feeds into a fan and valve unit 865. Similarly, each PCM 850, 855, 860 is connected to the load ground ("LGND") backplane 870. The fan and valve unit 865 is also connected to the LGND 870. The purpose of the fan and valve unit 865 is to provide thermal cooling in the cabinet so that the power conversion system 100 will not overheat.

Further, as shown in FIG. 8, each PCM 850, 855, 860 possesses multiple outputs that serve as inputs to a plurality of load modules 115. According to one embodiment of the invention, each PCM 850, 855, 860 shown in FIG. 8 provides fifteen 12 V DC outputs to fourteen loads 115. According to one embodiment of the invention, the fifteenth output may be allocated for expansion of the system. Each of the fourteen loads 115 has one input and is connected to the back plane LGND 870. Each PCM 850, 855, 860 is capable of supplying power to each load 115.

Under normal operating conditions, for example, PCM A 850 supplies primary power to loads 1-7 and provides backup power for loads 8-14. Accordingly, PCM C 860 supplies primary power to loads 8-14 and backup power to loads 1-7. The PCM B 855 module powered by the battery 830 is set to Off. If one of the operational PCMs 850, 860 malfunctions, then PCM B 855 receives a signal indicating that it should come online and assume the function of the malfunctioning PCM 850, 860. Prior to the PCM B 855 coming online, the sole operational PCM 850, 860 supplies power to all fourteen loads 115.

Figure 9:
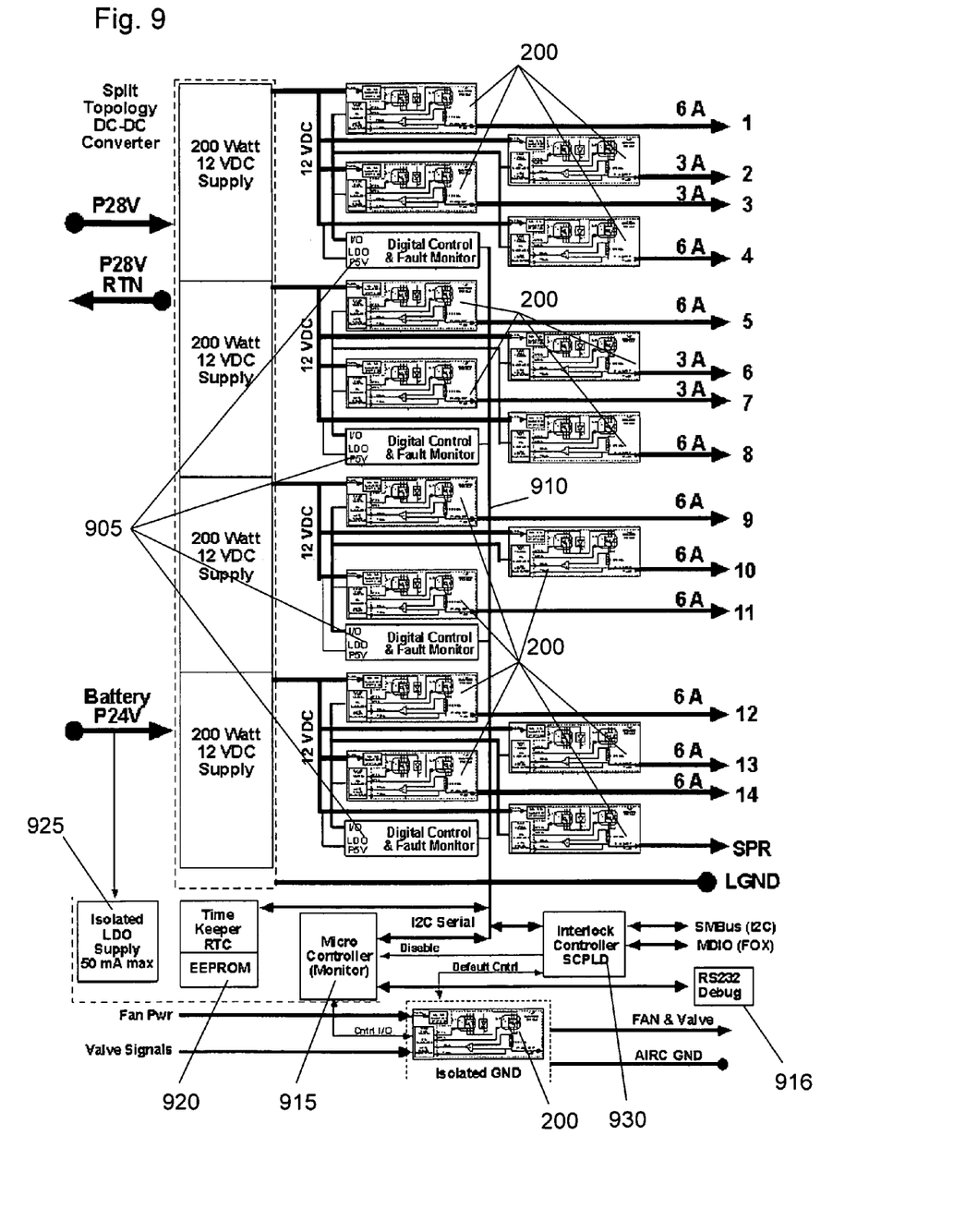
FIG. 9 is a detailed diagram of one power conditioning module present in the power conversion system shown in FIG. 8.

FIG. 9 shows a detailed view of a PCM 135 used to implement the system shown in FIG. 8. Each individual switched out power rail 200 and its corresponding output is shown. According to one embodiment of the invention, fifteen switched out power rails 200 are used to provide fifteen outputs. As shown in FIG. 9, each PS controller 225 of each individual switched out power rail 200 is connected to another PS controller 225 of another switched out power rail 200. According to one embodiment of the invention and as shown in FIG. 9, the switched output power rails 200 are connected via their PS controllers 225 in clusters of three or four switched output power rails 200. Each cluster of three or four PS controllers 225 is then operably connected to a digital control and fault monitor 905 via a serial communication interface, such as, by way of example only and not by way of limitation, an I²C (Phillips Semiconductor™) bus 910.

In addition, each digital control and fault monitor 905 is operably connected to a micro controller 915 and timing unit 920 via the I²C bus 910. The micro controller 915 and timing unit 920 are integrated into a larger control unit. The control unit includes an isolated LDO supply 925, a timing unit 920 with read only memory and a micro controller 915. In addition, the micro controller 915 is provided a RS232 port 916 for debugging. The micro controller 915 also receives input from an interlock controller 930. The interlock controller 930 is operably connected to a management data input/output feed and a system management Bus (SMBus). Finally, as shown in FIG. 9, a switched output power rail 200 for the fan and valve unit 865 is used. The switched out power rail 200 receives power from a dedicated fan power input. Additional inputs to the PS controller 225 are provided from valve signals and the microcontroller 915. In turn, the switched output power rail 200 provides the fan and valve system 865 with power.

The power conditioning modules and power conversion system of the present invention have several advantages. First, the system, according to at least one embodiment, decreases $I^2R$ power loss by segregating the distribution of current. In addition, the system, according to at least one embodiment, offers fail safe operation by providing a transient-free hot-backup secondary supply, ground independent isolation and built-in-test monitoring and feedback. Further, the power conditioning modules, according to at least one embodiment, are configured to implement reverse-current protection, voltage and current monitoring and feedback control. In addition, the system of the present invention supports the use of multiple converter supply topologies. Moreover, the power conversion and distribution system, according to at least one embodiment, eliminates or greatly reduces common mode fault issues associated with singe rail supply designs.

The design topology of the system improves reliability in several ways as faults are isolated, power dissipation is spread among multiple, lower loss components, and failures are determined with greater reliability. Performance is improved, power efficiency is improved, and life cycle costs are decreased with the increased reliability. Power supply converter efficiency allows for reduced volume packaging thereby decreasing weight, size and associated system costs. Further, the design of the system maintains a simple use of existing required components and re-partitions (re-applies) them to provide substantial architectural reliability, fault management and performance gains.

The foregoing description of an embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A power conditioning module, comprising:
   a plurality of switched output power rails, wherein each switched output power rail comprises:
   a first field effect transistor drive configured to receive an input and further configured to be controlled by a controller;
   a second field effect transistor drive configured to be controlled by the controller; and
   a circuit connected in parallel with said first field effect transistor drive, wherein said circuit is configured to provide reverse current protection and to supply a voltage output to said second field effect transistor drive when the first field effect transistor drive is inactive, said second field effect transistor drive is connected in series with (i) the first field effect transistor drive and (ii) said circuit, wherein the second field effect transistor drive is configured to deliver an output to a hot swap unit coupled to a load, and wherein the output to the hot swap unit is set to a first voltage when the controller activates the first and second field effect transistor drives, and the output is set to a second voltage that is less than the first voltage when the controller activates the first field effect transistor drive and deactivates the second field effect transistor drive.

2. The power conditioning module of claim 1, wherein each switched output power rail further comprises:
- a power converter configured to receive power from a power supply and provide input to the first field effect transistor; and
- a resistor connected in series with the second field effect transistor, configured to provide current feedback information to an isolation amplifier;
- wherein the controller is configured to provide control signals to the first and second field effect transistor drives and receive input from the isolation amplifier and a voltage monitoring feed operably connected to the output.

3. The power conditioning module of claim 2, wherein the power converter is a 12 V DC to DC power converter.

4. The power conditioning module of claim 2, wherein the resistor is a 0.020 ohm resistor.

5. A power conditioning module, as claimed in claim 1, further comprising:
- at least one power output; and
- a module housing enclosing the power conditioning module.

6. A power conditioning module according to claim 5, wherein the plurality of switched output power rails conduct electricity out of the module through an electrical inter-connect attached to the module housing.

7. An aircraft, comprising:
an airframe; and
a power conditioning module according to claim 5.

8. A power conversion system, comprising:
a first load;
a second load; and
a first power conditioning module according to claim 1, wherein the first power conditioning module further provides a first output to the first load and a second output to the second load, wherein the first power conditioning module is adapted to isolate a fault in the first load so that the fault will not diminish a performance of the second load.

* * * * *